(12) United States Patent
Lisi

(10) Patent No.: US 9,733,061 B2
(45) Date of Patent: Aug. 15, 2017

(54) DISTANCE DETERMINATION BASED ON REFLECTED ADMITTANCE

(71) Applicant: TEXAS INSTRUMENTS INCORPORATED, Dallas, TX (US)

(72) Inventor: Gianpaolo Lisi, Los Gatos, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 155 days.

(21) Appl. No.: 14/811,934

(22) Filed: Jul. 29, 2015

(65) Prior Publication Data
US 2017/0031050 A1 Feb. 2, 2017

(51) Int. Cl.
| G01B 7/14 | (2006.01) |
| G01B 7/30 | (2006.01) |
| G01D 5/20 | (2006.01) |
| G01B 7/02 | (2006.01) |
| G01D 5/12 | (2006.01) |

(52) U.S. Cl.
CPC ............. *G01B 7/023* (2013.01); *G01D 5/12* (2013.01)

(58) Field of Classification Search
CPC .................................... G01B 7/14; G01D 5/20
USPC ..................................................... 324/207.17
See application file for complete search history.

(56) References Cited

U.S. PATENT DOCUMENTS

| 3,997,835 | A | * | 12/1976 | Ando et al. | ............. 324/207.26 |
| 5,420,507 | A | * | 5/1995 | Laskowski | ................... 324/236 |
| 6,803,757 | B2 | * | 10/2004 | Slates | ....................... 324/207.17 |
| 8,476,896 | B2 | * | 7/2013 | Mednikov | ................ 324/207.15 |

* cited by examiner

*Primary Examiner* — Bot Ledynh
(74) *Attorney, Agent, or Firm* — John R. Pessetto; Charles A. Brill; Frank D. Cimino

(57) ABSTRACT

A distance measurement system includes a tank circuit including a transmit coil coupled to a transmit capacitor, a distance calculation circuit coupled to the transmit coil, and a target resonant circuit including a receive coil coupled to a receive capacitor. The receive coil is to receive a magnetic field generated by the tank circuit. The distance calculation circuit is to determine a reflected admittance. The reflected admittance includes a real component and an imaginary component. The distance calculation circuit is to determine a distance between the transmit and receive coils based on the imaginary component of the reflected admittance.

12 Claims, 4 Drawing Sheets

DISTANCE DETERMINATION BASED ON REFLECTED ADMITTANCE

BACKGROUND

Proximity sensors in widespread use in a multitude of applications and industries. Such sensors may be capable of submicron precision. Some proximity sensors operate based by exciting a tank circuit with a sinusoidal waveform. Eddy currents are induced in a nearby metal object, which in turn can be sensed in the tank circuit as a variable parallel impedance. The magnitude of the parallel impedance varies as a function of distance between the tank circuit and the metal object.

SUMMARY

The disclosed embodiments relate to determining distance between an excitation tank circuit and a resonant target circuit based on the reflected admittance of the tank circuit. More particularly, distance is determined based on the imaginary component of the reflected admittance. The imaginary component of the reflected admittance has little, if any, dependence on temperature and thus using the imaginary component enables a determination of distance without much dependence on temperature. Further, the real component of reflected admittance does have a dependence on temperature and thus can be used to determine the temperature of the resonant target.

In some embodiments, a distance measurement system includes a tank circuit including a transmit coil coupled to a transmit capacitor, a distance calculation circuit coupled to the transmit coil, and a target resonant circuit including a receive coil coupled to a receive capacitor. The receive coil is to receive a magnetic field generated by the tank circuit. The distance calculation circuit is to determine a reflected admittance. The reflected admittance includes a real component and an imaginary component. The distance calculation circuit is to determine a distance between the transmit and receive coils based on the imaginary component of the reflected admittance.

In other embodiments, an apparatus includes a transmit coil coupled to a transmitter capacitor and an induction-to-digital converter (LDC) coupled to the transmit coil and configured to determine an imaginary component of a reflected admittance and to determine a distance to a receive coil based on the determined imaginary component of the reflected admittance.

In yet another embodiment, a method includes sensing transmit coil voltage and current and determining real and imaginary components of transmit coil voltage and current. The method further includes determining real and imaginary components of a back electromotive force (BEMF) and determining an imaginary component of reflected admittance. The method also includes determining distance between the transmit coil and a receive coil in a target resonant circuit based on the imaginary component of the reflected admittance.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct wired or wireless connection. Thus, if a first device couples to a second device, that connection may be through a direct connection or through an indirect connection via other devices and connections.

The tank circuits of some position sensors include a printed circuit board (PCB) on which the tank circuit is formed. The components of such tank circuits may include an inductor (coil) and a capacitor. The capacitor and the series resistance of the coil have component values in units farads and ohms, respectively, that may vary with temperature. Such temperature dependencies impact the accuracy of the position readings derived from the position sensor. The values of the capacitor and series resistance also vary per manufacturing tolerances.

The distance measurement system described herein, however, provides position readings, or data indicative of position, with little if any variation due to temperature or component tolerances. The disclosed distance measurement system determines distance from an excitation tank circuit to a resonant target instead of a metal object. The resonant target includes a receive coil and a capacitor. The reflected admittance of the excitation tank circuit is used to determine distance, and thus in some embodiments impedance is not used. More specifically, the imaginary component of the reflected admittance is computed and used to determine the distance between the transmit coil in the excitation tank circuit and the receive coil in the resonant target. Further, the real component of the reflected admittance can be used to generate an estimate of temperature of the resonant target. Thus, the disclosed distance measurement system may generate either or both of distance between a tank circuit and a target and a temperature of the target.

Figure 1:
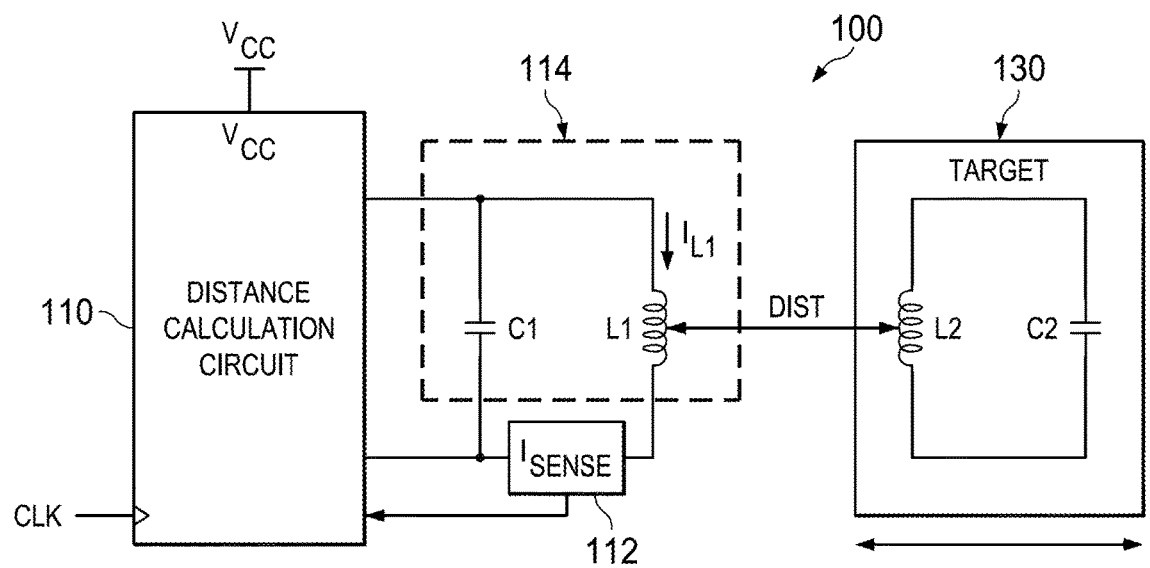
FIG. 1 shows a block diagram of a distance measurement system in accordance with various examples.

FIG. 1 shows a distance measurement system 100 which includes a distance calculation circuit 110 coupled to a tank circuit 114. The system 100 also includes a resonant target 130 (also referred to herein as a "target"). The target 130 can move relative to the tank circuit 114 and thus the distance DIST between the tank circuit and target may vary. The distance calculation circuit 110 determines this distance. The tank circuit 114 in the example of FIG. 1 includes a transmit coil L1 coupled in parallel with a transmit capacitor C1 as shown. Alternatively, the capacitor C1 can be coupled in series with transmit coil L1 or not be included at all. The target 130 is a resonant circuit and may include a receive coil L2 coupled in parallel to a receive capacitor C2. The distance DIST is the distance between the tank circuit 114 and the target 130, or more particularly, the distance between the transmit and receive coils L1 and L2. A current sensor 112 ($I_{sense}$) also is shown to provide a signal to the distance calculation circuit 110 indicative of the current through the transmit coil L1 (i.e., $I_{L1}$).

Distance measurement system 100 is a type of position sensor and can be used to detect the presence of the target 130 and, if desired, the distance to the target. The distance measurement system 100 can be used for a wide variety of applications such as automotive, industrial, push buttons, flow meters, high speed motor/gear controllers, etc. In many applications of the distance measurement system 100, the system 100 should be accurate in the face of large temperature variations and be relatively insensitive to manufacturing tolerances of its constituent components. The disclosed embodiment is directed to a distance measurement system that achieves these goals.

Figure 2:
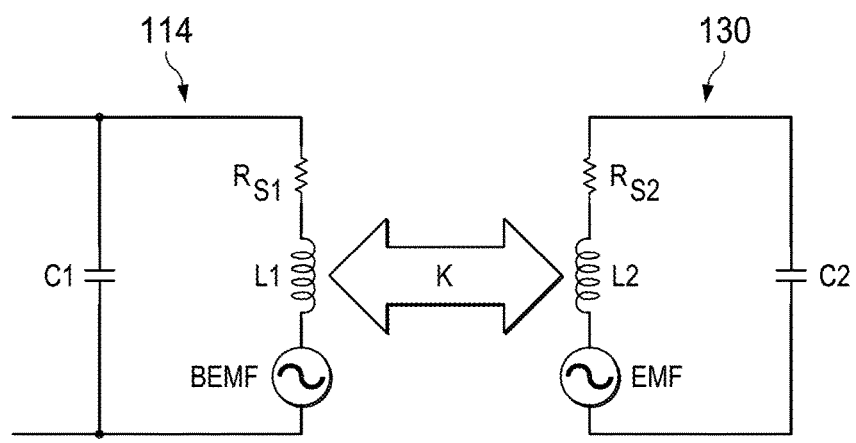
FIG. 2 illustrates a circuit model of a portion of the distance measurement system in accordance with various examples.

FIG. 2 shows a schematic model of the excitation tank circuit 114 and the resonant target 130. The transmit coil L1 has a series resistance shown as $R_{S1}$. Similarly, the receive coil L2 has a series resistance shown as $R_{S2}$. The tank circuit 114 is provided with a sinusoidal input signal (generated by the distance calculation circuit 110) at a particular operating frequency ($\omega$). The resonant target 130 has a resonant frequency based on the values of L2 and C2. The resonant frequency of the target 130 may be given as $\omega_2 = 1/\sqrt{L_2 C_2}$. The resonant frequency of the resonant target 130 may be same as the operating frequency, $\omega$, or it may be different. The transmit coil L1 generates a magnetic field which impinges on the receive coil L2. The change in the magnetic environment of the receive coil L2 causes an electromotive force (EMF) to be induced in the receive coil. The induced EMF is shown modeled in FIG. 2 as an EMF voltage source. The current flowing through the resonant target 130, in turn, generates a magnetic flux that results in a back EMF (BEMF) voltage in the transmit coil L1.

The parameter k refers to the coefficient of coupling between the transmit and receive coils L1 and L2. The coefficient of coupling may be a number between 0 and 1 which is dependent on the portion of the total magnetic flux lines that cuts both coils L1 and L2. For example, if all the flux lines generated by transmit coil L1 cut the receive coil L2, and all the lines of the flux generated by the receive coil L2 cut the transmit coil L1, then the coefficient of coupling would be one (unity). Lines of flux generated by one coil which do not link with the other coil represent "leakage flux," and leakage flux of the transmit coil L1 cannot induce a voltage into the receive coil L2. The voltage induced into the receive coil is therefore less than it would be if the leakage flux did not exist. The coefficient of coupling is strongly dependent on distance between the two coils.

The disclosed embodiments determine distance DIST based on the reflected admittance of the transmit coil L1. The reflected admittance, which is the inverse of impedance, is given by:

$$Y_{BEMF} = \frac{I_{L1}}{BEMF} \quad (1)$$

Because the drive current in, and voltage across, the transmit coil are sinusoidal signals, Eq. (1) can be transformed into the following equation when the real and imaginary components of the signals are included:

$$Y_{BEMF} = \frac{R_{S2} + j\omega L_2 - \frac{j}{\omega C_2}}{\omega^2 k^2 (L1)(L2)} \quad (2)$$

The denominator of the reflected admittance has only real components, and the numerator has imaginary components. Eq. (2) can be further represented as:

$$Y_{BEMF} = \frac{R_{s2}}{\omega^2 k^2 (L1)(L2)} + \frac{j\omega L_2 - \frac{j}{\omega C_2}}{\omega^2 k^2 (L1)(L2)} \quad (3)$$

Figure 3:
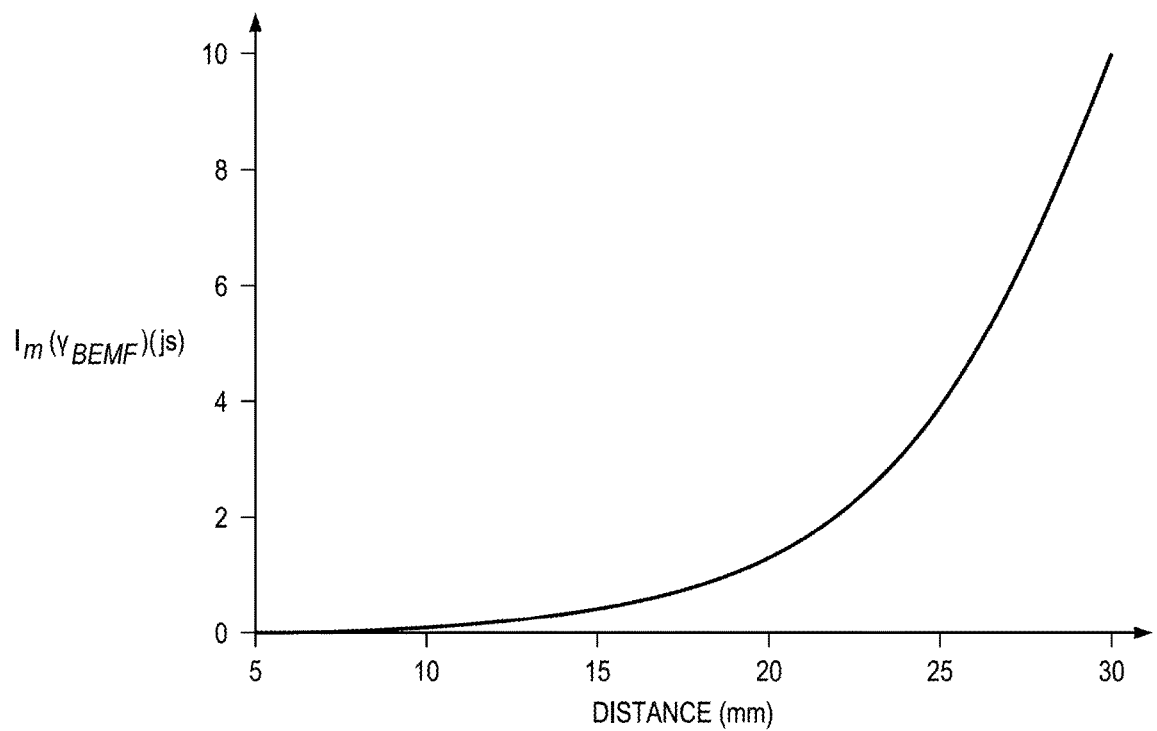
FIG. 3 shows the relationship between the imaginary component of reflected admittance and distance in accordance with various examples.

The term $$\frac{R_{s2}}{\omega^2 k^2 (L1)(L2)}$$

represents the real component of the reflected admittance, and the term $$\frac{j\omega L_2 - \frac{j}{\omega C_2}}{\omega^2 k^2 (L1)(L2)} = \frac{1}{\omega k^2 (L1)}\left(1 - \frac{\omega_2^2}{\omega^2}\right)$$

represents the imaginary component of the reflected admittance. Interestingly, the imaginary component of the reflected admittance includes the circuit component C2, L1, and L2. Those particular components have very little, if any, dependence on temperature. Thus, the disclosed embodiments base the determination of distance to the resonant target 130 on the imaginary component of the reflected admittance of the excitation tank circuit. Further, distance determined based on the imaginary component of the reflected admittance is not particular dependent on the tolerances of the components C2 and L2. Indeed, the reflected admittance $Y_{BEMF}$ can be expressed in terms of $\omega_2$ rather than C2 and L2. The resonance frequency $\omega_2$ can be easily determined as the frequency $\omega$ at which $Y_{BEMF}$ is equal to 0. FIG. 3 illustrates an example of the relationship between the imaginary component of the reflected admittance and distance.

The real component of the reflected admittance, $$\frac{R_{s2}}{\omega^2 k^2 (L1)(L2)},$$

includes a component ($R_{S2}$) whose component value may have a significant dependence on temperature. The rest of the components (L1 and L2) have little, if any, dependence on temperature. The relationship between the value of $R_{S2}$ and temperature is readily determined apriori. For example, if resistor $R_{S2}$ is formed on a copper printed circuit board, the dependence on temperature is based on the temperature coefficient of copper, which is a known quantity. Thus, in accordance with the disclosed embodiments, the value of the series resistance of the receive coil ($R_{S2}$) may be computed and used to determine temperature of the target 130.

Figure 4:
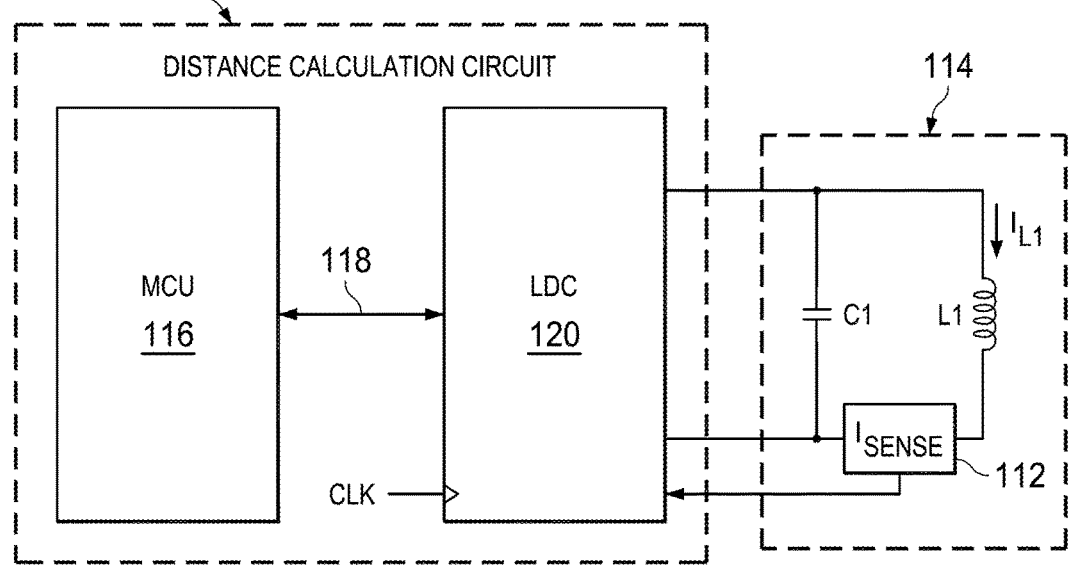
FIG. 4 shows an implementation of the distance measurement system in accordance with various examples.

FIG. 4 shows an example of the transmit side of the distance measurement system 100. The distance calculation circuit 110 is shown in the example of FIG. 4 to include a microcontroller unit (MCU) 116 coupled to an induction-to-digital converter (LDC) 120. The LDC 120 connects to the excitation tank circuit 114 comprising C1 and transmit coil L1. In some embodiments, the LDC 120 determines the real and imaginary components of the reflected admittance and provides those values over interface 118 to the MCU 116 for determination of temperature and distance, respectively, by the MCU. The interface 118 may be a serial interface such as an Inter-IC (I2C) bus, or other suitable communication interface. The MCU 116 may have look-up tables stored therein that map the imaginary component of the reflected admittance to distance and that map the value of $R_{S2}$ to temperature. Such tables can be accessed to generate the values of distance and temperature.

Figure 5:
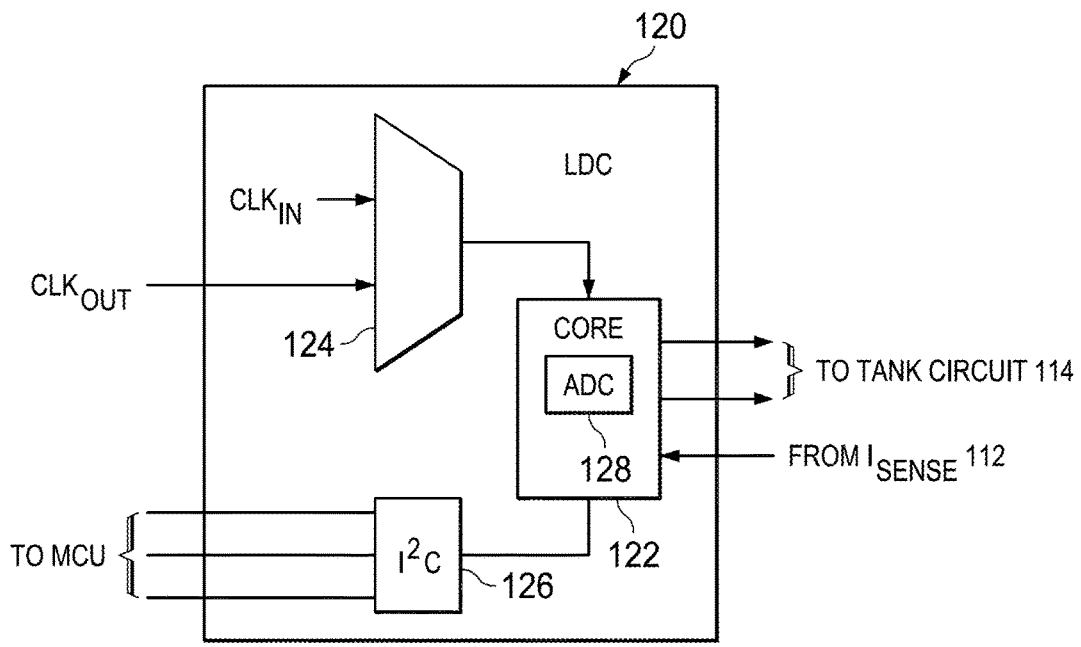
FIG. 5 shows an implementation of an inductor-to-digital converter (LDC) usable in the distance measurement system in accordance with various examples.

FIG. 5 shows an example of the LDC 120. As shown, the LDC 120 includes a core 122 coupled to an I2C interface 126. The core 122 may be implemented as a state machine, a programmable controller, or other type of circuit. The core 122 provides a sinusoidal signal to the tank circuit 114 and receives the current sense signal from $I_{sense}$ 112. The $I_{sense}$ 112 may be implemented as a low resistance resistor whose voltage is proportional to the transmit coil current $I_{L1}$. An externally sourced clock (CLKout) or an internally generated clock (CLKin) may be provided to the core 122 via multiplexer 124.

The LDC 120 includes one or more analog-to-digital converters (ADCs) 128 which can be used for a variety of purposes. One such purpose is to digitize analog signals indicative of transmitter coil current and voltage. Such digital values are used to determine distance and temperature as explained below.

Figure 6:
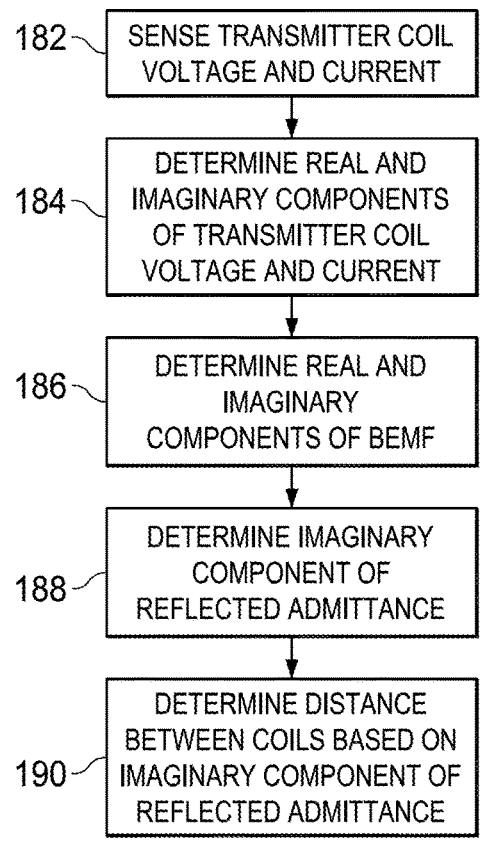
FIG. 6 shows a method for determining distance using the distance measurement system in accordance with various examples.

FIG. 6 shows a method by which the distance measurement system 100 determines distance. The various operations shown may be performed in the order shown or in a different order. Further, two or more of the operations may be performed in parallel rather than serially. In some embodiments, the operations are performed by the distance calculation circuit 110. The MCU 116 and LDC 120 may act in cooperation with each other to implement the specified method.

At 182, the method includes sensing the transmitter coil voltage and current. The LDC 120 generates a sinusoidal current (or voltage) to be applied to the tank circuit. The LDC 120 receives a signal from Isense 112 which is indicative of transmitter coil current IL1, digitizes that signal and, if desired, converts it to a value of transmitter coil current (e.g., by multiplying by a predetermined factor to convert from a voltage to a current value). The transmitter coil voltage also is sensed and digitized as well. In some embodiments, the digitized values of transmitter coil voltage and current may be provided across interface 118 from the LDC 120 to the MCU 116. The MCU 116 then may perform the rest of the calculations explained below to determine the value of DIST.

At 184, the method includes determining the real and imaginary components of the transmitter coil voltage and current. This operation may be performed in any of a number of ways. For example, intermediate frequency sampling may be used to sample the transmitter coil current and voltage. If we consider a generic sinusoidal signal $$v(t) = V * \sin\left(\frac{2\pi}{T} t + \vartheta\right)$$

where V is the amplitude of the signal, T is its period, t is time and θ is its phase.

In this technique, the underlying time varying signal is sampled at certain points in time, $t_i = i*N*T/4$, where i=0, 1, 2, 3, ... and N is an arbitrary odd integer. Subsequent samples will be obtained that correspond to the real and imaginary components of the signal being sampled (in a phasor representation). That is, at $i=1 \Rightarrow v_i(t_i) = -A*\cos(\phi)$ (where A and φ are the amplitude and phase of the signal)
at $i=2 \Rightarrow v_i(t_i) = -A*\sin(\phi)$
at $i=3 \Rightarrow v_i(t_i) = A*\cos(\phi)$
at $i=4 \Rightarrow v_i(t_i) = A*\sin(\phi)$
. . .

These values can be used to compute the real and imaginary components of the reflected admittance.

At this point, the real and imaginary components of the transmitter coil voltage have been determined. At 186, the real and imaginary components of the BEMF voltage are determined based on the real and imaginary components of the transmitter coil voltage. For example, assuming that the parasitic capacitance of the transmit coil L1 is ignored, the total coil voltage is:

transmitter coil voltage=BEMF+$I_{L1}$*($j\omega$L1+$R_{S1}$)     (4)

The value of BEMF can be derived by subtracting $I_{L1}$*($j\omega$L1+$R_{S1}$) from the sensed transmitter coil voltage. That is, BEMF can be calculated according to the following formula:

BEMF=transmitter coil voltage−$I_{L1}$*($j\omega$L1+$R_{S1}$)     (5)

A similar technique can be employed if the parasitic capacitance of the transmitter coil L1 is to be included.

At 188, the method includes determining the imaginary component of the reflected admittance. The imaginary component of the reflected admittance is computed as the ratio of the imaginary component of the transmit coil current to the sum of the real and imaginary components of the BEMF. That is, $$\text{Im}(Y_{BEMF}) = \frac{\text{Im}(I_{L1})}{\text{Re}(BEMF) + \text{Im}(BEMF)} \quad (6)$$

where Im($I_{L1}$) is the imaginary component of the transmit coil current, Re(BEMF) is the real component of the BEMF, and Im(BEMF) and is the imaginary component of the BEMF.

At 190, the distance DIST is determined between the transmit and receive coils L1 and L2 based on the imaginary component of the reflected admittance, Im($Y_{BEMF}$). In some embodiments, a look-up table may be prestored in the LDC 120 (e.g., in or accessible to the core 122). The look-up table may include multiple entries and each entry may include a different value of the imaginary component of the reflected admittance and a corresponding distance value. For example, a look-up table can be created based on the relationship depicted in FIG. 3.

Thus, based on the imaginary component of the reflected admittance, the distance measurement system 100 determines distance between a transmit coil L1 and a resonant target 130. The distance measurement system 100 may report the distance value to other logic and/or cause a response to occur based on the determined distance value. For example, a button can be determined to have been pressed or the speed of a motor may be adjusted.

As explained above, the distance measurement system 100 also may determine temperature of the resonant target. As noted above, the term $$\frac{R_{s2}}{\omega^2 k^2 L1 L2}$$

represents the real component of the reflected admittance. That is, $$\mathrm{Re}(\Upsilon_{BEMF}) = \frac{R_{s2}}{\omega^2 k^2 (L1)(L2)}. \quad (7)$$

The series resistance $R_{S2}$ of the receive coil L2 is dependent on temperature and thus can be used as a temperature sensor for the resonant target 130. In accordance with various embodiments, $R_{S2}$ is computed from Eq. (7) above. The value of $\mathrm{Re}(\gamma_{BEMF})$ is computed (e.g., by the MCU 116) as:

$$\mathrm{Re}(\Upsilon_{BEMF}) = \frac{\mathrm{Re}(I_{L1})}{\mathrm{Re}(BEMF) + \mathrm{Im}(BEMF)} \quad (8)$$

The real and imaginary components of BEMF can be calculated as explained above with respect to operation 186 in FIG. 6. The real component of the transmit coil current also can be calculated as explained above with respect to operation 184 in FIG. 6. In some embodiments, these values are not recalculated after determining distance and are saved in storage in the LDC's core 122 and retrieved when needed to compute the value of $\mathrm{Re}(\gamma_{BEMF})$.

Referring back to Eq. (7), ω is the operating frequency of the tank circuit 114 and thus is known and stored in the distance calculation circuit 110. Similarly, the inductance values of transmit and receive coils L1 and L2 are determined during the design of the circuit and/or can be measured during production and do not vary much with temperature. Thus, the values of L1 and L2 are known apriori as well and stored in the distance calculation circuit 110.

To compute $R_{S2}$ from Eq. (7), the coefficient of coupling (k) needs to be determined. The value of k (or $k^2$) can be determined based on the imaginary component of the reflected admittance. Per Eq. (3) above, the imaginary component of the reflected admittance is $$\frac{j\omega I_{L2} - \frac{j}{\omega C2}}{\omega^2 k^2 (L1)(L2)}.$$

Applying algebra and simplifying that expression results in the following formula for the imaginary component of the reflected admittance:

$$\mathrm{Im}(\Gamma_{BEMF}) = \frac{1}{\omega k^2 L_1}\left(1 - \frac{\omega_2^2}{\omega^2}\right) \quad (9)$$

where $\omega_2$ is the resonant frequency of the resonant target 130. The resonant frequency of the resonant target 130 may be the same as, or different from, the operating frequency of the excitation tank circuit 114. The value of k (or $k^2$) may be computed from Eq. (9) but the resonant frequency of the resonant target ($\omega_2$) must be determined in order to compute k. The other values in Eq. (9) are known, namely, the imaginary component of the reflected admittance (determined in operation 188 above), the inductance value of the transmit coil L1 and the operating frequency ω.

Figure 7:
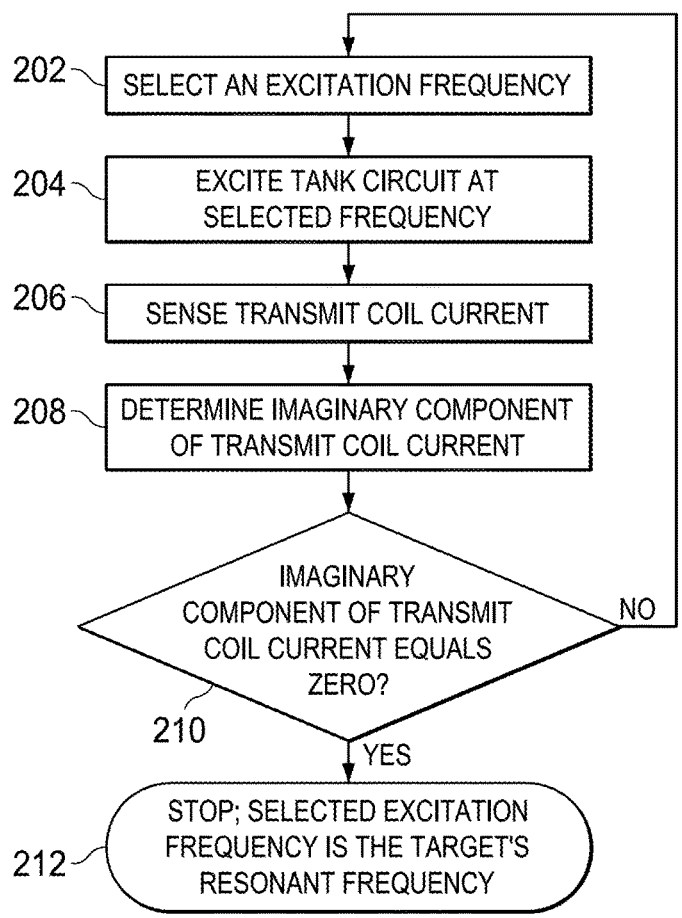
FIG. 7 shows a method for determining the resonant frequency of the resonant target in accordance with various examples.

In some embodiments, the resonant frequency of the resonant target 130 is determined in a calibration process. The calibration process may be implemented automatically by the LDC's core 122 and run at regular intervals (e.g., once per day). FIG. 7 shows a flow diagram illustrating one way to determine the resonant frequency, $\omega_2$, of the target 130. The operations shown may be performed by cooperative action of the MCU 116 and the LDC 120.

The flow diagram shows that the operating frequency is swept across a range of frequencies. At each operating frequency, the distance calculation circuit 110 determines whether the imaginary component of the reflected admittance is 0. Per Eq. (9), the operating frequency at which the imaginary component of the reflected admittance is 0 is the resonant frequency of the resonant target 130. That is, when $\omega_2=\omega$, the ratio $\omega_2^2/\omega^2$ becomes 1 and the value of $\mathrm{Im}(\gamma_{BEMF})$ thus becomes 0. Per Eq. (6), the imaginary component of the reflected admittance will be 0 when the imaginary component of the transmit coil current ($\mathrm{Im}(I_{L1})$) is 0.

At 202, an excitation frequency ω is selected. The selected frequency may be within range known to capture the resonant frequency of the resonant target 130. The initial selected frequency ω may be selected as the lowest most frequency in the range and may be incremented by a fixed amount with each iteration through the process of FIG. 7 until the resonant frequency of the target 130 is determined.

At 204, the tank circuit 114 is excited at the selected frequency. While the tank circuit is being excited, the transmit coil current is sensed at 206. The $I_{sense}$ 112 may be used to provide a signal indicative of the transmit coil current to the LDC 120. At 208, the method includes determining the imaginary component of the transmit coil current. The same or similar process as that described above with respect to 184 in FIG. 6 can be used to determine the imaginary component of the transmit coil current during this calibration process.

A 210, a determination is made as to whether the imaginary component of the transmit coil current is 0 (or less than a predetermined threshold close to 0). If the imaginary component of the transmit coil current is not equal to 0 (or not less than the predetermined threshold), then the process repeats starting at 202 with a new excitation frequency being selected. If, however, the imaginary component of the transmit coil current is equal to 0 (or less than the threshold), then process stops at 212. At that point, the resonant frequency $\omega_2$ of the resonant target 130 is the same as the operating frequency ω selected at 202 for the current iteration. The value of $\omega_2$ may be stored in the distance calculation circuit 110 (e.g., in the MCU 116) for subsequent use in determining temperature of the resonant target 130.

Figure 8:
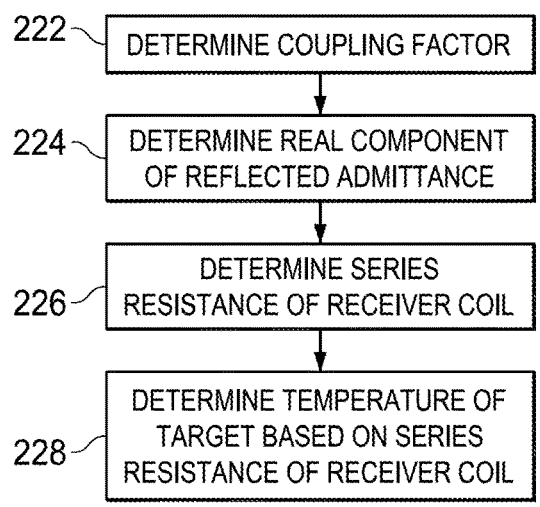
FIG. 8 shows a method for determining the temperature of the target in accordance with various examples.

FIG. 8 illustrates a method for determining the temperature of the resonant target. In some embodiments, the method may be performed by the MCU 116. Once the resonant frequency $\omega_2$ is known (e.g., per the process of FIG. 7) then per Eq. (9) the coefficient of coupling k (or $k^2$)

can be determined (222). The MCU 116 may compute the value of k (or $k^2$) using Eq. (9).

At 224, the method includes determining the real component of the reflected admittance. The real component of the reflected admittance is computed as the ratio of the real component of the transmit coil current to the sum of the real and imaginary components of the BEMF. That is, $$\text{Re}(Y_{BEMF}) = \frac{\text{Re}(I_{L1})}{\text{Re}(BEMF) + \text{Im}(BEMF)} \quad (10)$$

where $\text{Re}(I_{L1})$ is the real component of the transmit coil current and, as noted previously, Re(BEMF) and Im(BEMF) are the real and imaginary components of BEMF.

Once the coefficient of coupling and the real component of the reflected admittance are determined, those values can be used in Eq. (7) from which the value of $R_{S2}$ can be determined. The values of L1, L2, and the operating frequency $\omega$ also are known. The only unknown value is $R_{S2}$ and thus it can be computed by, for example, the MCU 116.

Once the value of the series resistance ($R_{S2}$) of the receive coil L2 is determined, then at 228, the temperature of the resonant target 130 can be determined based on the value of $R_{S2}$. As with the distance determination, a look-up table may be created and stored in the distance calculation circuit (e.g., in the MCU 116). The look-table may include multiple entries and each entry provides a different value of $R_{S2}$ and a corresponding temperature value. The data in the look-up table may be generated empirically.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A distance measurement system, comprising:
   a tank circuit including a transmit coil coupled to a transmit capacitor;
   a distance calculation circuit coupled to the transmit coil; and
   a target resonant circuit including a receive coil coupled to a receive capacitor, wherein the receive coil is to receive a magnetic field generated by the tank circuit;
   wherein the distance calculation circuit is to determine a reflected admittance, wherein the reflected admittance includes a real component and an imaginary component, and wherein the distance calculation circuit is to determine a distance between the transmit and receive coils based on the imaginary component of the reflected admittance.

2. The distance measurement system of claim 1 further comprising a current sensor to sense current through the transmit coil and to provide the sensed transmit coil current to the distance calculation circuit, and wherein the distance measurement circuit is to:
   receive a transmit coil voltage; and
   perform intermediate frequency sampling of the transmit coil voltage and sensed transmit coil current to produce real and imaginary components of the transmit coil voltage and real and imaginary components of the transmit coil current.

3. The distance measurement system of claim 2 wherein the distance measurement circuit is to determine real and imaginary components of a back electromotive force (BEMF) based on the real and imaginary components of the transmit coil voltage.

4. The distance measurement system of claim 3 wherein the distance measurement circuit is to determine the distance based on the real and imaginary components of the BEMF and based on the imaginary component of the transmit coil current.

5. The distance measurement system of claim 3 wherein the distance measurement circuit is to determine the distance based on the ratio of the imaginary component of the transmit coil current to the sum of the real and imaginary components of the BEMF.

6. The distance measurement system of claim 5 wherein the distance measurement circuit is to use the ratio to retrieve the distance from a look-up table.

7. The distance measurement system of claim 1 wherein the distance calculation circuit is to determine a temperature value based on the real component of the admittance.

8. The distance measurement system of claim 1 wherein the distance calculation circuit is to:
   determine a coefficient of coupling between the transmit and receive coils using the imaginary component of the reflected admittance;
   determine the resistance of the receive coil using the coefficient of coupling; and
   determine a temperature value based on the determined resistance of the receiver coil.

9. The apparatus of claim 1 further comprising a current sensor to sense current through the transmit coil and to provide the sensed transmit coil current to the LDC, and wherein the LDC is to:
   receive a transmit coil voltage;
   perform intermediate frequency sampling of the transmit coil voltage and sensed transmit coil current to produce real and imaginary components of the transmit coil voltage and real and imaginary components of the transmit coil current; and
   determine real and imaginary components of a back electromotive force (BEMF) abased on the real and imaginary components of the transmit coil voltage.

10. The apparatus of claim 9 wherein the LDC is to determine the distance based on the real and imaginary components of the BEMF and based on the imaginary component of the transmit coil current.

11. The apparatus of claim 9 wherein the LDC is to determine the distance based on the ratio of the imaginary component of the transmit coil current to the sum of the real and imaginary components of the BEMF.

12. The apparatus of claim 11 wherein the LDC is to use the ratio to retrieve the distance from a look-up table stored on the distance measurement circuit.

* * * * *